(12) United States Patent
Ros et al.

(10) Patent No.: US 7,551,463 B2
(45) Date of Patent: Jun. 23, 2009

(54) AC/DC CONVERTER WITH LOW HARMONIC CURRENTS

(75) Inventors: Thierry Ros, Bourg les Valence (FR); Christophe Taurand, Valence (FR)

(73) Assignee: Thales, Neuilly-sur-Seine (FR)

( * ) Notice: Subject to any disclaimer, the term of this patent is extended or adjusted under 35 U.S.C. 154(b) by 178 days.

(21) Appl. No.: 11/596,127

(22) PCT Filed: Apr. 21, 2005

(86) PCT No.: PCT/EP2005/051786

§ 371 (c)(1),
(2), (4) Date: Nov. 9, 2006

(87) PCT Pub. No.: WO2005/109615

PCT Pub. Date: Nov. 17, 2005

(65) Prior Publication Data

US 2008/0031021 A1     Feb. 7, 2008

(30) Foreign Application Priority Data

May 11, 2004   (FR) .................................. 04 05089

(51) Int. Cl.
*H02M 7/04*   (2006.01)
(52) U.S. Cl. ............................. 363/89; 363/49; 323/288
(58) Field of Classification Search ............... 363/21.01, 363/21.04, 21.07, 21.12, 21.17, 78, 79, 89, 363/98; 323/282–290, 222, 205, 207, 224
See application file for complete search history.

(56) References Cited

U.S. PATENT DOCUMENTS

| 4,716,510 | A | * | 12/1987 | Pace et al. ..................... 363/49 |
| 5,134,355 | A | * | 7/1992 | Hastings ..................... 323/211 |
| 5,636,108 | A | | 6/1997 | Taurand |
| 5,638,265 | A | * | 6/1997 | Gabor ......................... 363/89 |
| 5,745,351 | A | | 4/1998 | Taurand |
| 6,121,768 | A | | 9/2000 | Taurand |
| 6,462,558 | B1 | | 10/2002 | Taurand |
| 6,473,323 | B1 | | 10/2002 | Taurand |
| 6,606,022 | B1 | | 8/2003 | Taurand |
| 2004/0051513 | A1 | | 3/2004 | Rupp et al. |

FOREIGN PATENT DOCUMENTS

| WO | 89/05057 | 6/1989 |
| WO | WO 89/05057 A | 6/1989 |
| WO | 03/050932 A1 | 6/2003 |
| WO | WO 03/050935 A | 6/2003 |

* cited by examiner

*Primary Examiner*—Rajnikant B Patel
(74) *Attorney, Agent, or Firm*—Lowe Hauptman Ham & Berner, LLP

(57) ABSTRACT

This AC/DC converter is an isolated converter with switch-mode current regulation by means of a controlled switch (5). The controlled switch (5) is protected by a current limiting device (9, 7) obeying a peak current setpoint proportional to the instantaneous voltage from the power supply source (Vin). This allows the quality of the absorbed current to be improved and the risks of interference from the switch-mode power supply to be limited while at the same time satisfying the new demands on avionics power networks.

9 Claims, 8 Drawing Sheets

AC/DC CONVERTER WITH LOW HARMONIC CURRENTS

Figure 1:
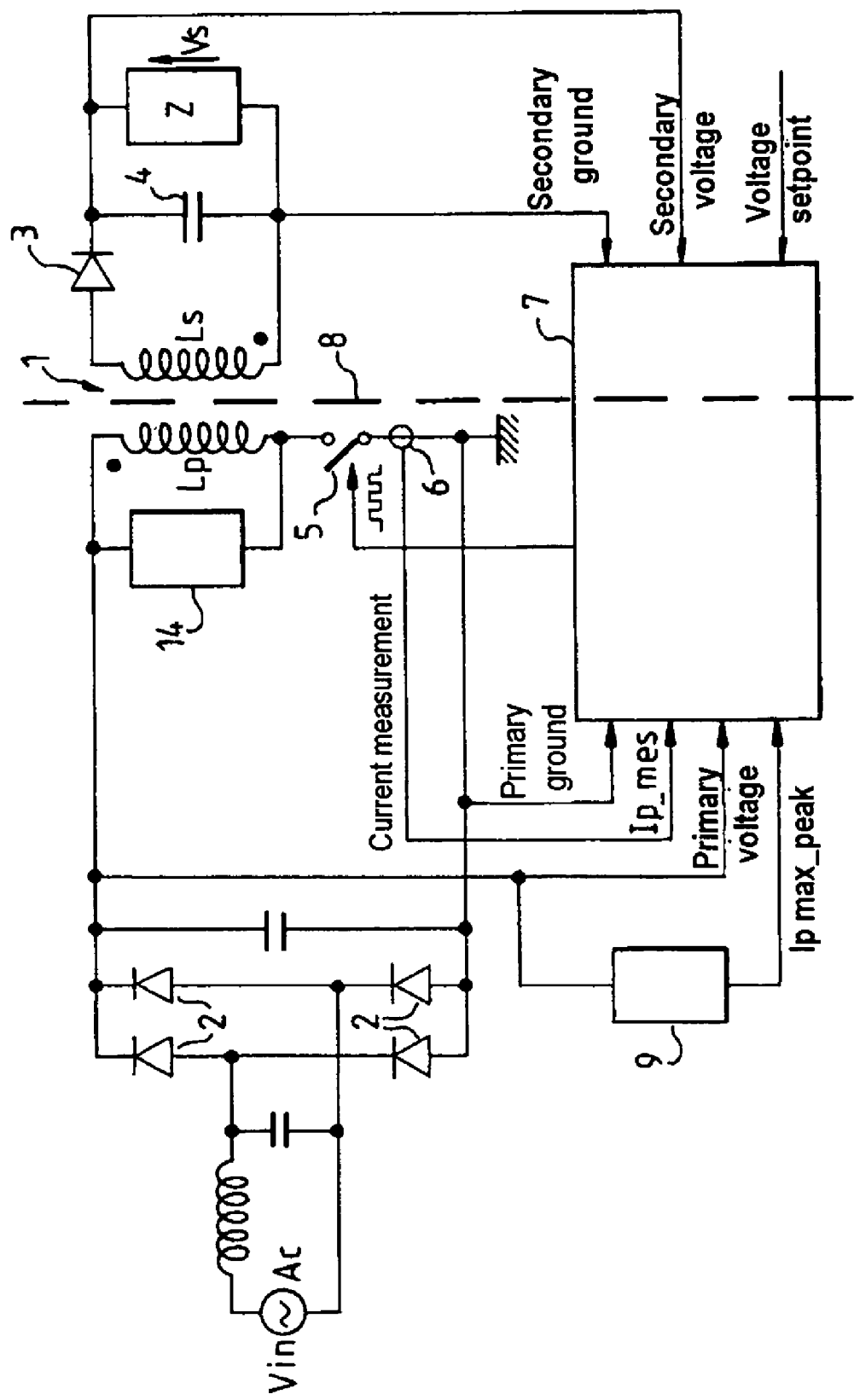

The invention relates to AC/DC voltage switch-mode converters, with consumption of anharmonic current and unity power factor.

For a long time, converters of the AC/DC type have had the serious drawback of absorbing a high-ripple factor, non-sinusoidal current, which is a source of harmonic distortion of their power supply networks. The harmonic distortions of the current lead to a distortion of the voltage delivered by a power supply network, owing to the non-zero impedances of the generator and of the distribution. These line-supply voltage distortions can then interfere with the operation of other equipment powered by this same supply network. Moreover, a high ripple factor degrades the power factor of the equipment, which means that the generator and the power distribution network must be over-designed. The result of this is a higher cost and an increase in weight which is especially unacceptable in the fields of avionics.

In order that this be avoided, the standards relating to loads designed to be connected to electrical networks impose increasingly severe limitations on the interference induced by AC/DC converters. These limitations cover, in particular, the power factor, the total harmonic distortion, or THD, and the maximum level of the current harmonics as a function of their rank.

In the field of avionics, a tolerance to power networks with highly distorted voltages, together with operation on variable frequency power networks, is also added.

To these demands relevant to a steady-state operation mode are added other demands relating to the behavior in transient modes of operation. During a start-up, short over- or under-voltages, micro-cutouts and current surges must be limited and remain anharmonic.

In the field of AC/DC converters meeting at least partially these demands, that are isolated and of low power (less than 500 Watts), two types of structures prevail: two-stage structures and single-stage structures.

In two-stage structures, the first stage AC/DC converter is a power factor corrector mainly devoted to the reduction of interference induced onto the network, whereas the second stage is a DC/DC converter. The galvanic isolation between input and output is in the second stage DC/DC converter. The first stage, which is of the 'boost' step-up converter type, does not allow control of the surge current at start-up guaranteeing good performance in the transient phases. In addition, the control circuits for the switches of the two stages are not simple because they require the use of analog multipliers in order to effect the feedback control of the input current.

Single-stage structures comprise a single AC/DC voltage converter with input-output galvanic isolation. For low powers, the topology most often chosen is 'flyback' topology which makes use of the magnetization inductance of a transformer providing the galvanic isolation between input and output. A switch in series with the primary of the transformer controls the periodic injection of a rectified current originating from the source of alternating current supply into the inductance of the isolation transformer. The time for which the switch is closed determines the intensity of an injection of current into the inductance of the isolation transformer. This is determined by a switching control circuit that balances the power absorbed from the power supply network and the power consumed by the load and the losses in the converter, with a view to maintaining the output voltage of the converter at a setpoint level while at the same time limiting the peak current flowing in the switch.

In normal operating mode, a flyback converter operates in discontinuous current conduction mode. At the opening of the switch, the peak primary current reaches an intensity proportional to the input voltage and to the conduction time. In steady-state mode, the absorption of current coming from the power supply source is sinusoidal if the duty cycle is kept constant. However, the transient phases at start-up and the end of short cutouts, together with short-circuits at the output, generate spikes in the absorbed current which may be clipped by the peak current limitation of the switch control circuit, but this cutting off is the cause of interference and of instabilities in the power supply source.

A known solution for overcoming this problem at start-up is to slowly increase the duty cycle (a technique called 'soft-start'), but this solution is not compatible with the demands on the form of the input current during micro-cutouts.

Another known solution, from the international patent application WO 89/05057, is to limit the peak current flowing through the controlled switch of a single-stage converter of the flyback type, depending on the instantaneous voltage from the power supply source, by means of a modulator circuit with analog multiplier performing the product of an image $U_{2r}$ of the voltage error at the output of the converter with the rectified image $U_s$ from the power supply source. The presence of an analog multiplier makes the control circuit of the controlled switch more complex to design and less performant owing to the drifts inherent in this type of circuit.

The aim of the present invention is to attempt to overcome the aforementioned drawbacks and to reduce the interference injected by an AC/DC voltage converter onto the alternating electrical network supplying it, including in the transient operating phases.

The subject of the invention is an AC/DC voltage converter with low anharmonic currents and using switch-mode regulation of a rectified current coming from a power supply source of alternating electric current, by means of at least one controlled switch subjected, by a control device, to switching cycles with variable duty cycle adjusted in such a manner as to cancel an output voltage error detected by an error corrector and to adhere to a limitation setpoint for the peak current generated by a peak current setpoint generator as a function of the instantaneous voltage from the power supply source. This AC/DC voltage converter is noteworthy in that the control device comprises an oscillator equipped with a pulse-width modulator PWM controlled by the error corrector with a view to canceling an output voltage error, and a logic circuit inserted into the output of the pulse-width modulator PWM ensuring the disabling of the controlled switch or switches each time the instantaneous current flowing through the controlled switch or switches exceeds the setpoint generated by the peak current maximum setpoint generator.

Advantageously, the peak current maximum setpoint generator generates a peak current limitation setpoint $I_{pmax\_peak}$ which is a spline function, by parts, of the instantaneous voltage from the power supply source $V_{in\_inst}$ meeting the definition:

$$I_{pmax\_peak} = k_i V_{in\_inst} + b_i \text{ } i \text{ integer varying from 1 to } n$$

n being the number of parts of the spline function defined by successive ranges of variations of the instantaneous voltage $V_{in\_inst}$ from the power supply source, an i-th part corresponding to the range:

$$(V_{in\_inst})_{Max(i-1)} \leq V_{in\_inst} \leq (V_{in\_inst})_{Maxi}$$

$$(V_{in\_inst})_{Max0} = 0,$$

$(V_{in\_inst})_{Maxi}$ being the value of a transition between the $i_{-th}$ and $(i+1)_{-th\ parts}$ and $k_i$ and $b_i$ being constants whose values depend on the part i in question.

Advantageously, the converter has a flyback topology and operates in discontinuous conduction mode.

Advantageously, when the converter has an input circuit connected to the power supply source, containing the controlled switch, an output circuit galvanically isolated from the input circuit and a switch control device having elements divided between the input and output circuits, its switch control device comprises, in the output circuit, at least one error correction circuit integrating the difference between the output voltage of the converter and a setpoint voltage, at the interface between the input and output circuits, a galvanic isolation component transporting the output signal of the error correction circuit toward the input circuit, to a control signal generator circuit for the controlled switch.

Advantageously, when the converter has an input circuit connected to the power supply source containing the controlled switch, an output circuit galvanically isolated from the input circuit and a switch control device having elements divided between the input and output circuits, its switch control device comprises, in the output circuit, at least one error correction circuit integrating the difference between the output voltage of the converter and a setpoint voltage, an oscillator with a variable duty cycle controlled by the error correction circuit supplying, for the controlled switch, a control logic signal with two states one of which corresponds to a conduction command, the other to an off command, being pulse-width modulated and, at the interface between the input and output circuits, a galvanic isolation component transporting toward the input circuit, to the controlled switch, the control logic signal.

Advantageously, when the converter makes use of an inductance, in switch-mode operation, supplied with current from the power supply source via the controlled switch, it comprises an input current harmonic reduction circuit formed by an oscillation damping circuit connected across the terminals of the inductance.

Advantageously, the input current harmonic reduction circuit is a dissipative circuit comprising a capacitor placed in series with a resistor across the terminals of the inductance.

Advantageously, the input current harmonic reduction circuit is a non-dissipative switched circuit comprising an auxiliary controlled switch placed in series with a flywheel diode across the terminals of the inductance, allowing the inductance to be short-circuited during the times where it is not supplied with current by the power supply source.

Advantageously, when the converter makes use of the inductance, in switch-mode operation, of an isolation transformer providing a galvanic isolation between input and output, it comprises:

on the secondary side of the transformer,
    an error corrector delivering a setpoint which is a function of the difference presented by the output voltage of the converter with respect to a voltage setpoint,
straddling the boundary separating the primary and secondary sides of the transformer,
    a galvanic isolation coupler transmitting the output setpoint from the error corrector to the primary side of the transformer, and
on the primary side of the transformer,
    a rectifier circuit supplying an unregulated DC electrical voltage,
    a pulse-width modulated oscillator controlled by the setpoint produced by the error corrector and transmitted by the coupler supplying, to the controlled switch, a switching signal composed of pulses,
    a current sensor measuring the instantaneous current flowing through the controlled switch,
    a peak current threshold crossing detector circuit comparing the setpoint delivered by the peak current setpoint generator with the instantaneous current measured by the current sensor, and
    a pulse inhibitor circuit inserted between the pulse-width modulated oscillator and the control of the controlled switch, triggered by the threshold crossing detector circuit and reset by each pulse of the switching signal delivered by the pulse-width modulated oscillator.

Advantageously, when the converter makes use of the inductance, in switch-mode operation, of an isolation transformer providing a galvanic isolation between input and output, it comprises:

on the secondary side of the transformer,
    an error corrector delivering a setpoint which is a function of the difference presented by the output voltage of the converter with respect to a voltage setpoint, and
    an oscillator, called main oscillator, with pulse-width modulation controlled by the setpoint output from the error corrector, supplying a switching signal,
straddling the boundary separating the primary and secondary sides of the transformer,
    a galvanic isolation coupler transmitting the signal from the main oscillator toward the control of the controlled switch,
on the primary side of the transformer,
    a rectifier circuit supplying an unregulated DC electrical voltage,
    an oscillator, called auxiliary oscillator, supplied by the rectifier circuit placed on the primary side of the transformer and supplying periodic pulses driving the controlled switch into conduction,
    a routing circuit, with two inputs and one output, inserted behind the outputs of the auxiliary oscillator and of the coupler, giving priority to the signal, when it exists, from the main oscillator transmitted by the coupler,
    a current sensor measuring the instantaneous current flowing through the controlled switch,
    a peak current threshold crossing detector circuit comparing the setpoint delivered by the peak current setpoint generator with the instantaneous current measured by the current sensor, and
    a pulse inhibitor circuit placed at the output of the routing circuit, triggered by the threshold crossing detector circuit and reset by each pulse crossing the routing circuit.

Figure 2:
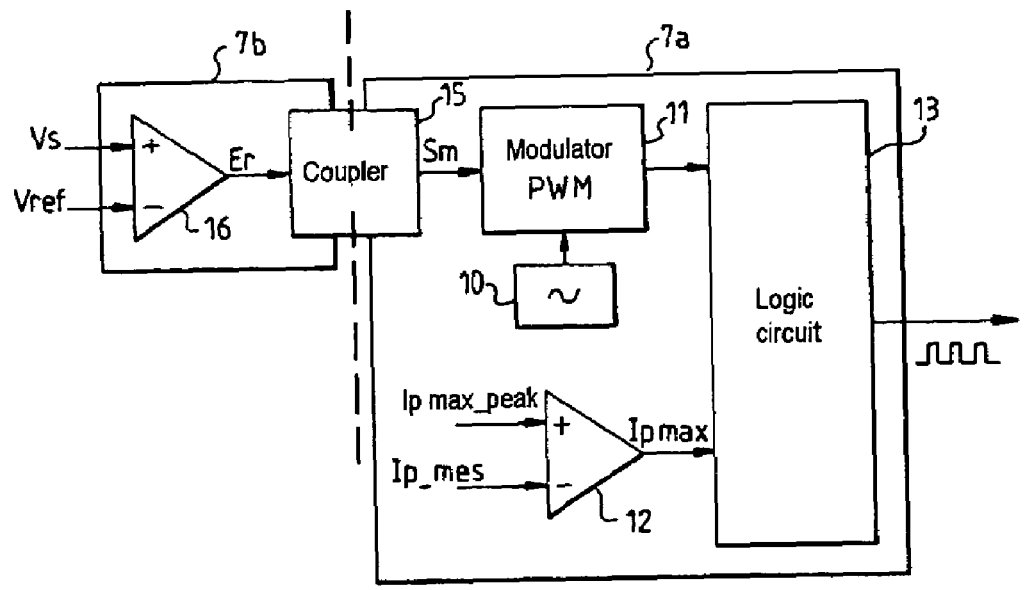
Figure 3:
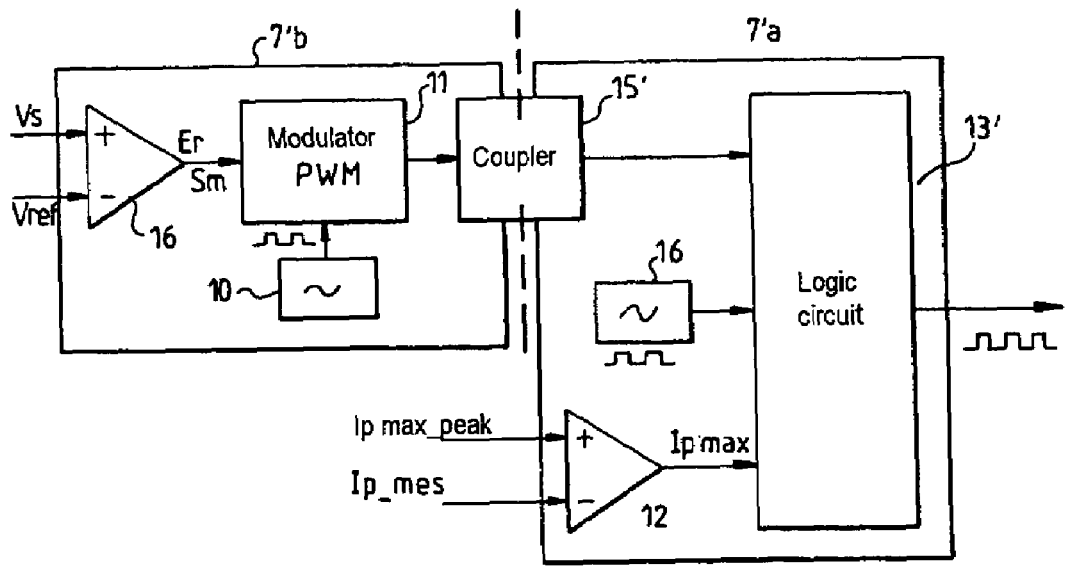
Figure 4:
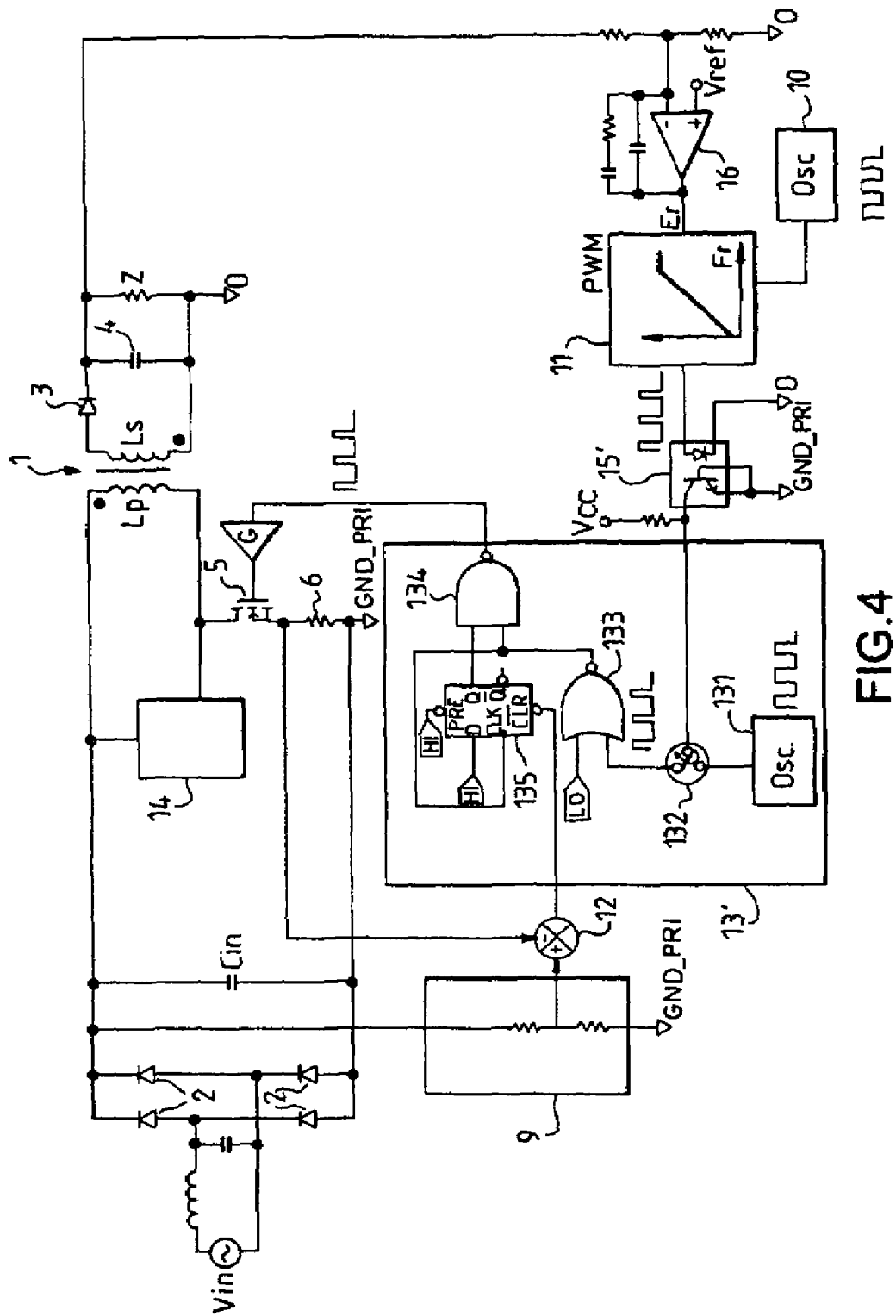
Figure 5:
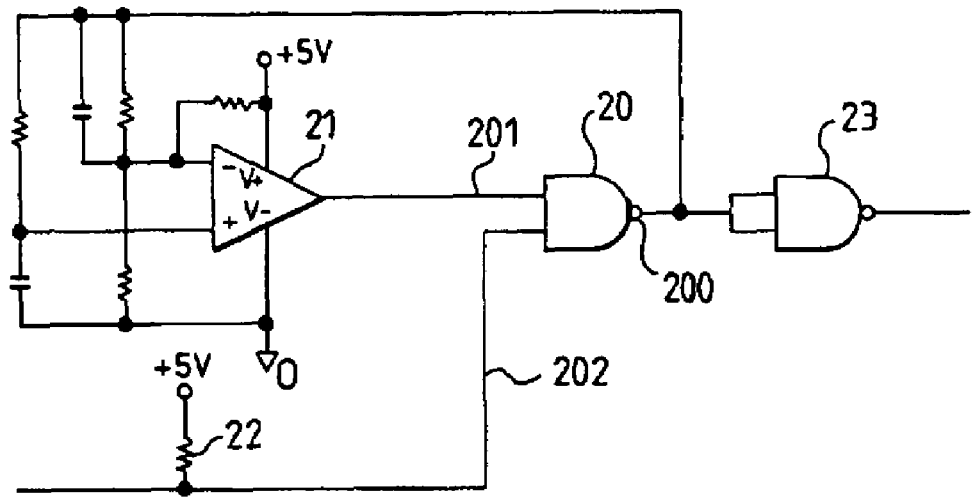
Figure 6:
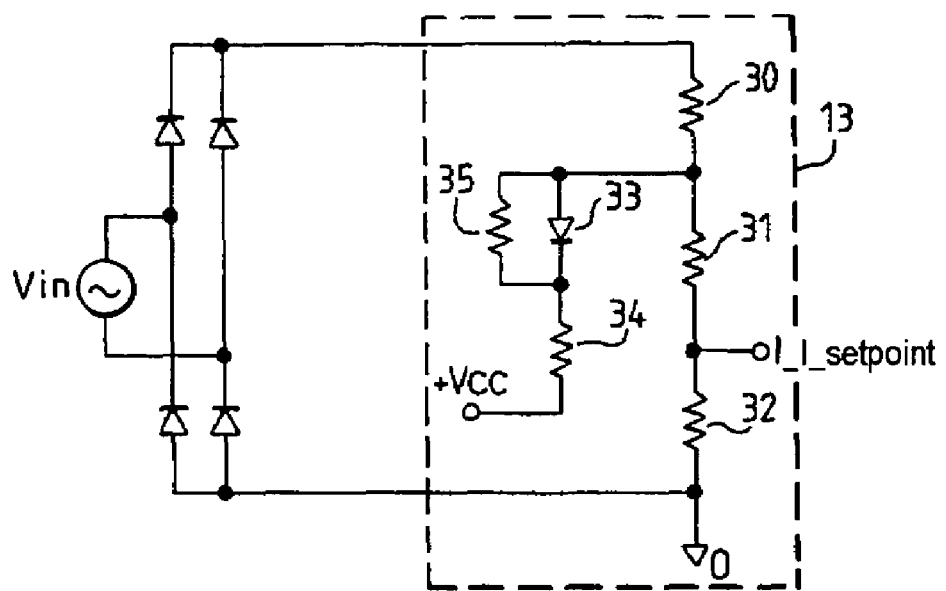
Figure 7:
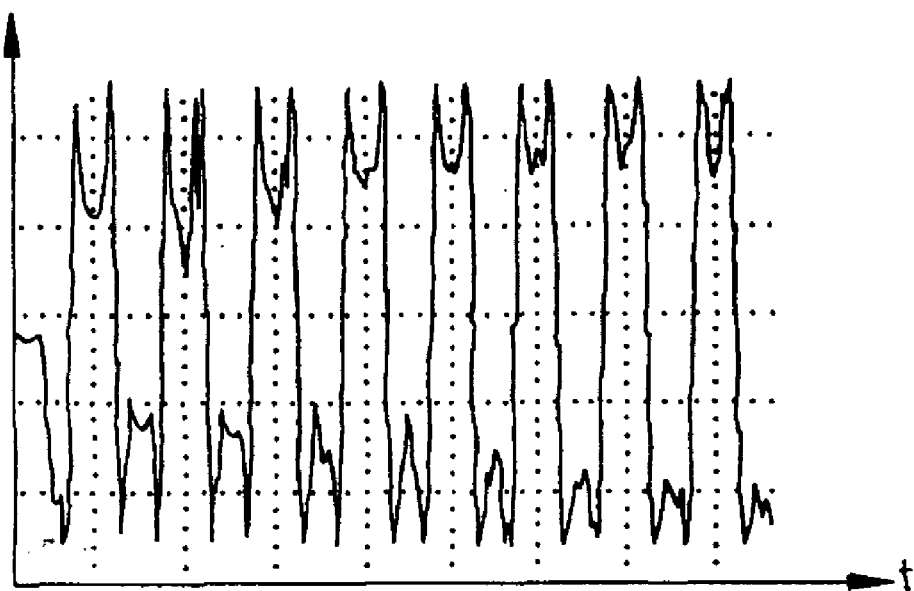
Figure 8:
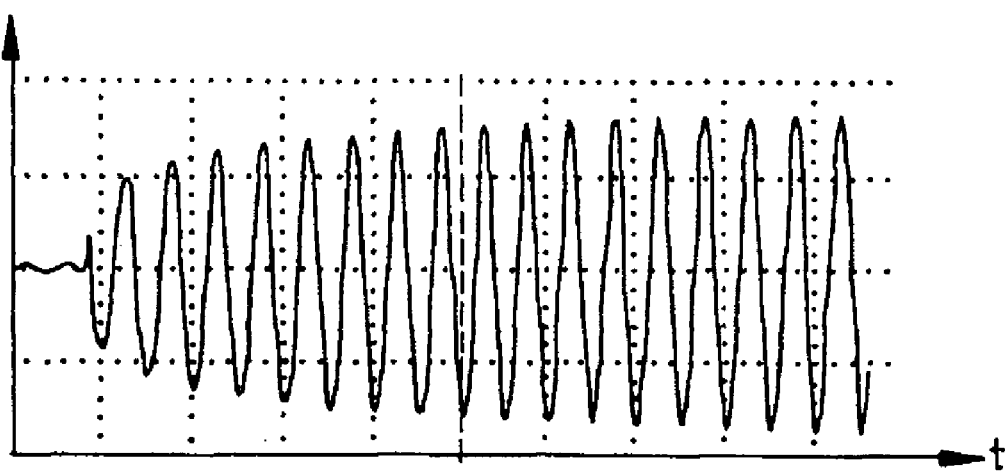
Figure 9:
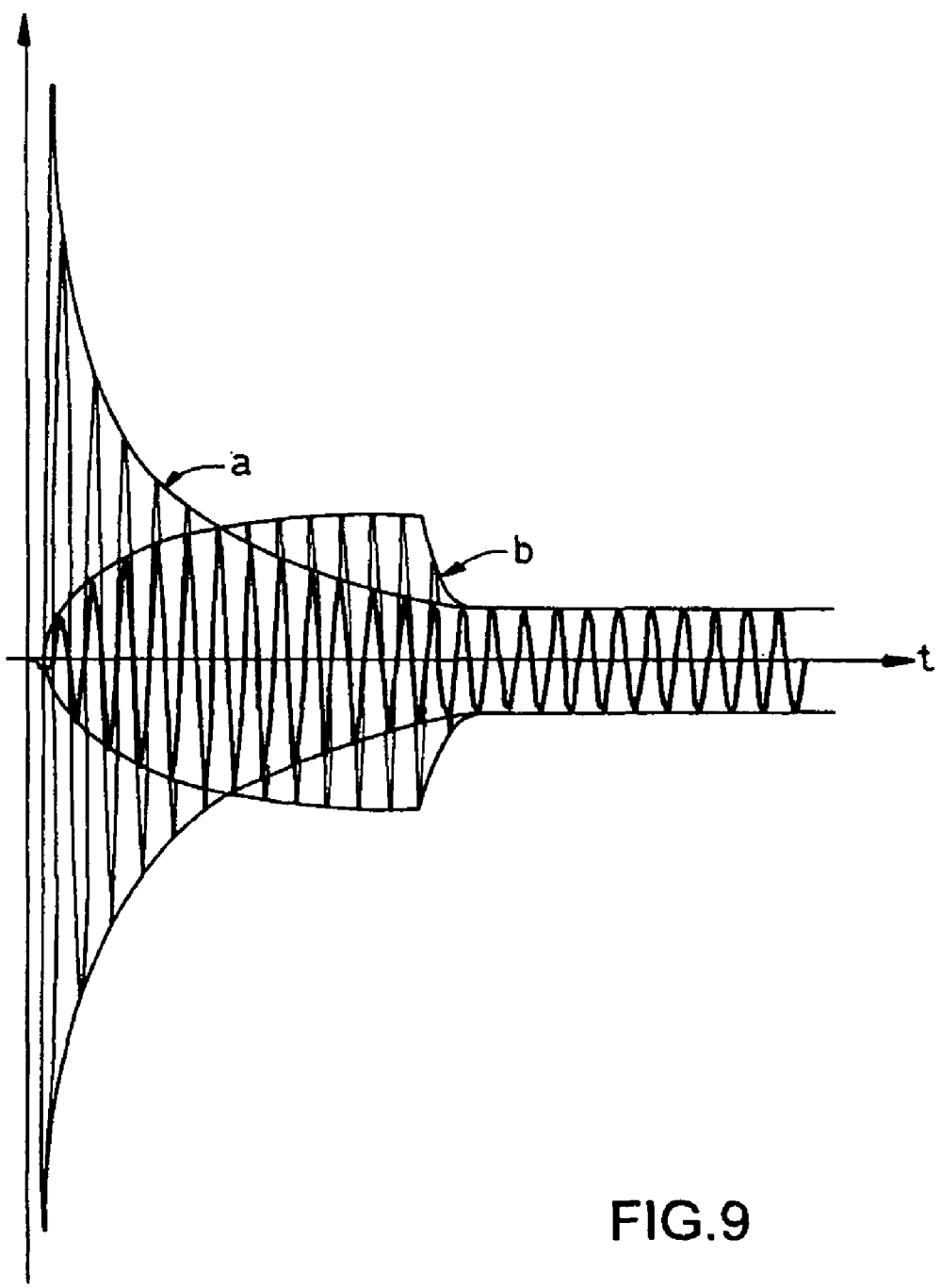
Figure 10:
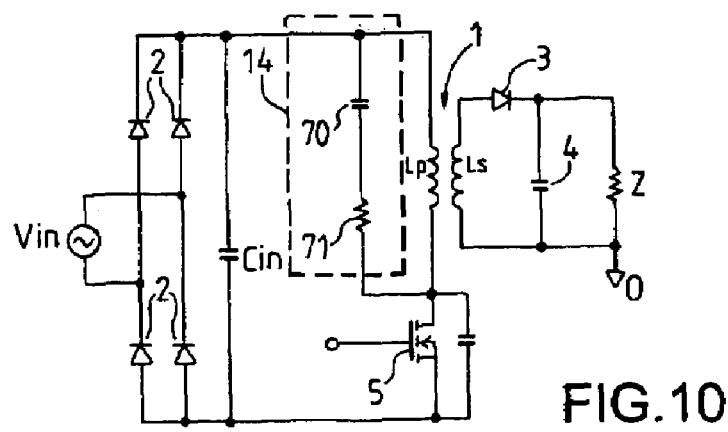
Figure 11:
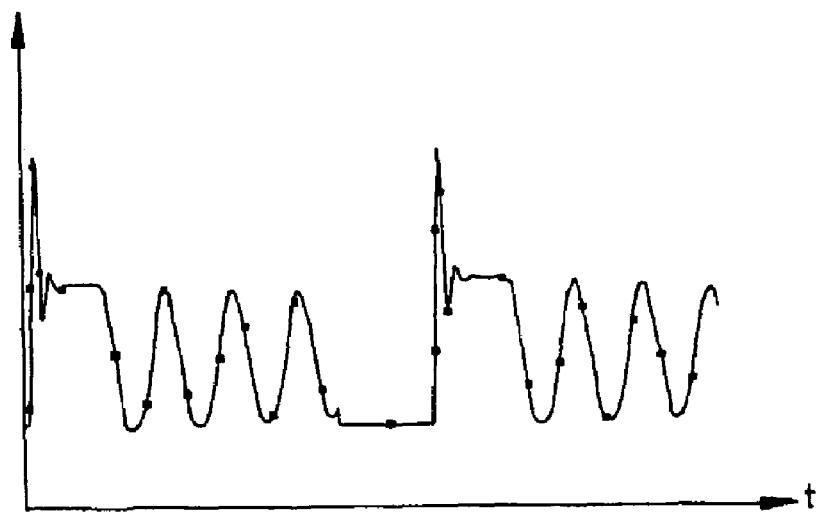
Figure 12:
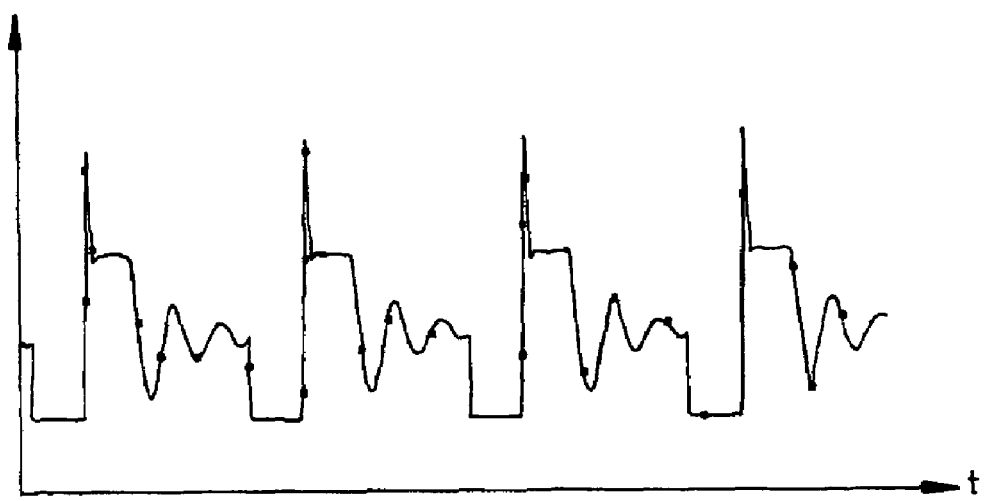
Figure 13:
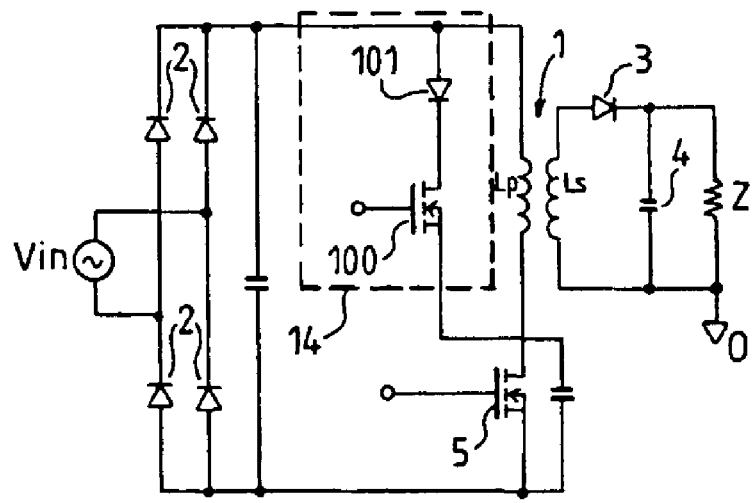
Figure 14:
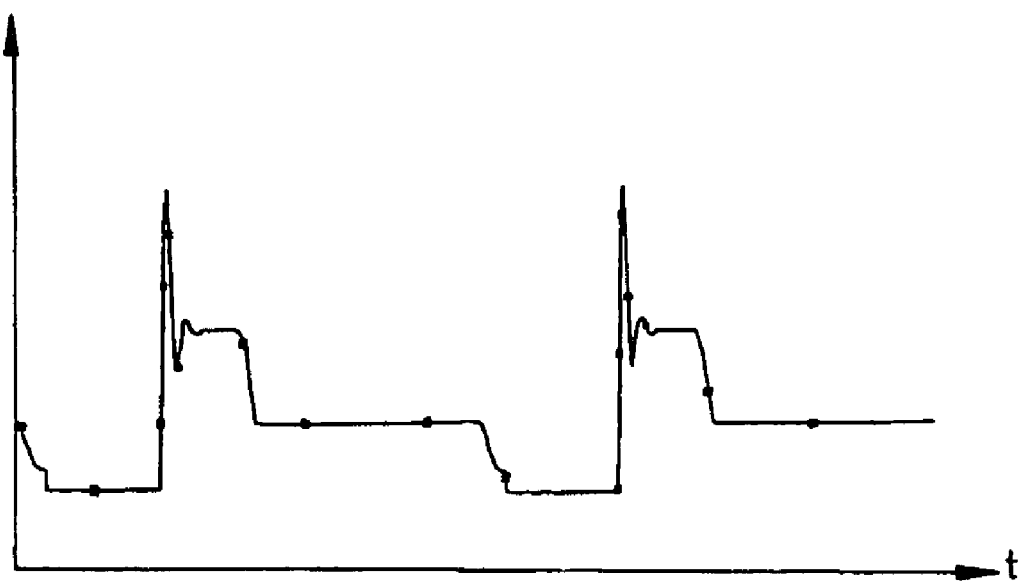

Other features and advantages of the invention will become apparent from the description hereinbelow of one embodiment presented by way of example. This description will be presented with regard to the drawing in which:

FIG. 1 is a schematic circuit diagram of an AC/DC converter of the flyback type in discontinuous conduction mode according to the invention, FIGS. 2 and 3 are circuit diagrams illustrating two examples of distribution of the elements of a control device for a controlled switch appearing in FIG. 1, FIG. 4 is the circuit diagram of an exemplary AC/DC converter of the flyback type according to the invention, FIG. 5 is a circuit diagram of an oscillator combined with a routing circuit giving the priority to the signal of an external oscillator, FIG. 6 is a circuit diagram detailing one embodiment of a peak current limitation setpoint generator, FIGS. 7, 8 and 9 are diagrams illustrating waveforms showing the operational differences between an AC/DC converter according to the invention and an AC/DC converter of the prior art, FIG. 10 is a circuit diagram detailing one embodiment of an oscillation damping circuit, FIG. 11 is a diagram showing the shape of the parasitic oscillations caused during the dead times by the magnetization energy, FIG. 12 is a diagram showing the damping of the parasitic oscillations, achieved with the damping circuit shown in FIG. 10, FIG. 13 is a circuit diagram detailing another embodiment of an oscillation damping circuit, and FIG. 14 is a diagram showing the damping of the parasitic oscillations achieved with the damping circuit shown in FIG. 13.

The AC/DC converter illustrated in FIG. 1 supplies a load Z with DC current from an alternating current power supply source Vin. Its structure is of the flyback type with a transformer 1 whose primary winding Lp is supplied, by driven switching, with rectified voltage delivered by a full-wave rectifier bridge 2 connected across the terminals of the alternating current power supply source Vin and whose secondary winding Ls is connected across the terminals of a load Z via a rectifier diode 3 and a filtering capacitor 4.

The driven switching of the rectified current supplied to the primary winding Lp of the transformer 1 is effected by means of a controlled switch 5 connected in series with the primary winding Lp of the transformer 1 across the DC terminals of the rectifier bridge 2.

In the discontinuous conduction mode of operation where the current in the rectifier diode 3 placed in the secondary circuit of the transformer 1 becomes zero before the end of each switching cycle of the controlled switch 5, the magnetic flux within the core of the transformer 1 becomes zero at each switching cycle of the controlled switch 5. Upon the closing of the controlled switch 5, the current in the primary winding Lp of the transformer 1 starts at a value of zero. During this first period, the rectifier diode 3 placed in the secondary circuit of the transformer 1 is reverse biased and the primary current of the transformer 1 increases linearly. Upon the opening of the controlled switch 5, since the flux within the core of the transformer 1 cannot instantaneously fall to zero, a current flows within the secondary winding Ls of the transformer 1 making the rectifier diode 3 conduct which charges up the filtering capacitor 4 and supplies the load Z.

The controlled switch 5 may take various forms and notably the form of one or more semiconductor devices connected in parallel, for example one or more CMOS transistors placed in parallel.

The voltage across the terminals of the load Z is regulated by adjusting the conduction time of each switching cycle of the controlled switch 5 whose total duration is kept constant. The control signal of the controlled switch 5 is a logic control signal with two states, one corresponding to a conduction command and the other to an off command, of fixed frequency and of variable duty cycle. It is supplied by a control device 7 with the galvanic isolation 8 across it that separates the primary and secondary circuits of the transformer 1.

In the following explanations, it is assumed that the high states of the control signal of the controlled switch 5 correspond to a close command and the low states to an open command. The control signal is generated, within the control device 7, by a pulse-width modulator PWM applying a pulse-width modulation to a square-wave binary signal supplied by an oscillator which fixes the frequency of the switching cycles. The modulator PWM allows the duty cycle high state/low state, in other words closed time/open time, to be varied as a function of an error signal integrating, over a certain time, the difference between the voltage Vs measured across the terminals of the load Z and a setpoint voltage Vref, both applied to inputs of the part of the control device 7 referenced with respect to the ground of the secondary circuit of the transformer 1. The pulse-width modulator PWM integrated into the control device 7 extends the conduction time of each cycle if the voltage measured across the terminals of the load Z is tending to become lower than the setpoint and shortens it in the opposite case.

The control device 7 comprises, in its part referenced with respect to the ground of the primary circuit of the transformer 1, a device for inhibiting its pulse-width modulator PWM which receives, on one side, a peak current maximum setpoint Ipmax_peak coming to it from a primary peak current maximum setpoint generator 9 analyzing the instantaneous voltage delivered by the rectifier bridge 2 and, on the other, a measurement of the instantaneous current Ip_mes flowing through the controlled switch 5 supplied by a primary current measurement device 6.

FIGS. 2 and 3 give two examples of distribution of the elements of the control device 7 between its two parts referenced with respect to separate grounds galvanically isolated from one another, those of the primary and secondary circuits of the transformer 1. The pulse-width modulator PWM is shown separately from the other logic functions of the control circuit 7 because it may be placed either on the input side of the AC/DC converter or on the output side.

In the distribution in FIG. 2, the majority of the elements of the control device 7 are placed within its part 7a referenced with respect to the ground of the primary circuit of the transformer 1, its part 7b referenced with respect to the ground of the secondary circuit of the transformer 1 only containing a minimum number of elements.

The part 7a referenced with respect to the ground of the primary circuit of the transformer 1 contains an oscillator 10 supplying a square-wave signal at the switching frequency of the controlled switch 5, a pulse-width modulator PWM 11 acting on the signal of the oscillator 10 as a function of a modulating signal Sm, a subtractor 12 delivering a primary current limitation setpoint Ip_max corresponding to the primary peak current maximum setpoint Ipmax_peak delivered by the primary peak current maximum setpoint generator 9, reduced by the instantaneous current measurement Ip_mes supplied by the primary current measurement device 6, and a logic circuit 13 combining the primary current limitation setpoint Ip_max with the modulated signal coming from the pulse-width modulator PWM 11.

The part 7b referenced with respect to the ground of the secondary circuit of the transformer 1 only contains an error corrector 16 supplying an analog error signal Er deduced from the difference existing between the voltage Vs of the secondary circuit of the transformer 1 and a setpoint value Vref.

Between the two parts 7a and 7b of the control device 7 for the controlled switch 5, a coupler 15 transmits, in the form of the analog signal Sm, the error signal Er produced by the error corrector 16 of the part 7b, to the modulation input of the pulse-width modulator PWM 11 of the part 7a. This coupler 15, which provides the galvanic isolation between the two parts 7a and 7b of the control device 7, can be formed by means of a linear opto-coupler or of a pulse transformer inserted between coding and decoding circuits.

In the distribution in FIG. 3, the pulse-width modulator PWM 11 and the oscillator 10 that supplies it with a signal to be modulated are transferred into the part 7'b referenced with respect to the ground of the secondary circuit of the transformer 1. This allows the control logic signal, which is a binary signal and not an analog signal, for the controlled switch or switches to be transmitted via the coupler 15', and makes possible a synchronization on the output side of the AC/DC converter transmitted across the galvanic isolation by the control logic signal. The AC/DC converter is thus able to be synchronized with other functions in order to reduce the risks of interference, noise or frequency beating, which is especially useful in avionics applications. On the other hand, in the part 7'a, referenced with respect to the primary circuit of the transformer 1, an auxiliary oscillator 16 must be provided, that takes the role of the pulse-width modulator PWM 11, by means of the logic circuit 13', in the absence of voltage in the secondary circuit of the transformer 1. The displacement of the coupler 15' to the output of the pulse-width modulator PWM means that it no longer operates in analog mode but in binary with the advantage of an insensitivity to the interference associated with the common-mode currents due to a biasing by low electrical currents and also to the variations of the optronic transmission gain for signals with a wide range of amplitude variation which are a cause of malfunction. This may be achieved by means of a fast binary logic opto-coupler, a pulse transformer, a capacitive link, or even by a link of the radiofrequency type.

FIG. 4 details an exemplary embodiment of an AC/DC converter having a control device 7 for its controlled switch 5 whose elements follow the distribution illustrated in FIG. 3.

The main oscillator 10, the pulse-width modulation circuit PWM 11 and the error corrector 16 are supplied by the secondary circuit of the transformer 1. The binary signal controlling the controlled switch 5 that they generate is transferred to the primary side of the transformer 1 by means of an opto-coupler 15' ensuring that the galvanic isolation existing between the primary and secondary circuits of the transformer 1 is maintained. Since the transmitted signal is binary, it is unaffected by the gain and biasing drifts of the opto-coupler 15'.

The error corrector 16 is formed by means of a comparator configured as an integrator in order to deliver a mean, over a certain time period, of the difference existing between the DC voltage Vs delivered to the secondary of the transformer 1 and the setpoint voltage Vref.

The binary signal controlling the controlled switch 5 transmitted by the opto-coupler 15' is applied to the controlled switch 5 through a logic circuit 13' allowing it, on the one hand, to be substituted by a backup version when it fails due to the absence of DC voltage on the secondary of the transformer 1 and, on the other, to be turned off in order to stop the conduction of the controlled switch 5 as soon as the exceeding of a maximum intensity setpoint by the current flowing through the primary winding Lp of the transformer 1 has been detected.

More precisely, the control logic circuit 13', which is supplied by the rectifier bridge 2 of the primary circuit of the transformer 1, comprises:

an auxiliary oscillator 131 supplying a square-wave signal, symmetrical to and of frequency close to and of the same form as that from the main oscillator 10, but not synchronized with the latter, a routing circuit 132 giving priority to the switching control signal coming from the main oscillator 10 via the pulse-width modulation circuit 11 and the opto-coupler 15', a circuit 133 for interrupting the switching control signal, here formed by a logic gate of the NOR type owing to an inversion of the switching control signal by a pulse inhibitor circuit placed downstream, and the pulse inhibitor circuit formed by a logic gate of the NAND type 134 left free or forced into the zero state (absence of pulse) by a logic flip-flop of the D type 135 whose transition to zero causes that of the logic AND gate 134 and whose transition to one is caused by the rising edge of each pulse of the switching control signal.

The control input of the interruption circuit 133 allows the AC/DC converter to be stopped at will, for example when the input voltage falls below a minimum operational voltage threshold.

The control input of the pulse inhibitor circuit, which is formed by the reset input of its D-type flip-flop 135, is controlled by the limiting comparator 12 that receives, on one side, a primary peak current maximum setpoint Ipmax_peak coming to it from a primary peak current maximum setpoint generator 9 and, on the other, a measurement of the instantaneous current Ip_mes flowing through the controlled switch 5 taken by a current measurement device 6.

The current measurement device 6 may be of any known type. It may operate for example by means of a measurement resistor or of a current transformer inserted in series with the primary winding of the transformer 1.

The exemplary embodiment that has just been described in relation to FIG. 4 can be easily adapted to a distribution of the elements of the control device according to FIG. 2. For this adaptation, the oscillator 10 and the pulse-width modulator PWM 11 are transferred into the primary circuit of the transformer 1, whereas the auxiliary oscillator 131 and the routing circuit 132 are eliminated.

FIG. 5 gives an example of auxiliary oscillator circuit 131 associated with a routing circuit 132 giving it a non-priority status. The auxiliary oscillator is formed from a logic gate of the NAND type 20 whose output 200 is fed back onto one 201 of its inputs via an operational amplifier 21 configured as an integrator. The operational amplifier 21 configured as an integrator plays the role of a delay circuit allowing the feedback of the logic state of the output 200 onto the input 201 to be delayed. This allows the oscillation frequency to be adjusted to the desired level. In order to have oscillation, the other input 202 must be at the high logic level (logic 1). This condition is achieved by the biasing resistor 22 pulling the other input 202 up to the positive terminal of the power supply source, here the plus terminal of the rectifier bridge 2. The auxiliary oscillator obtained has a duty cycle of 50% and the integrator is dimensioned such that the oscillator operates at the frequency of the master oscillator. When the signal from the main oscillator 10 is applied to the other input 202, it takes over from the auxiliary oscillator because its low states (logic 0) impose a high state on the output 200 of the NAND logic gate 20 and its transitions from a low state (logic 0) to a high state (logic 1) always occur after the operational amplifier 21 has transmitted the output high state (logic 1) to the input 201 since it has a duty cycle (high state/low state) below or equal to 50%. The second NAND logic gate 23 corrects the signal inversion caused by the first NAND logic gate 20.

The primary peak current maximum setpoint generator 9 generates a peak current limitation setpoint ($I_{p\_peak}$) which is a spline function, by parts, of the instantaneous voltage from the power supply source ($V_{in\_inst}$) meeting the definition:

$$I_{pmax\_peak} = k_i V_{in\_inst} + b_i \text{ } i \text{ integer varying from 1 to } n$$

n being the number of parts of the spline function defined by successive ranges of variations of the instantaneous voltage $V_{in\_inst}$ from the power supply source, an i-th part corresponding to a range:

$$(V_{in\_inst})_{Max(i-1)} \leq V_{in\_inst} \leq (V_{in\_inst})_{Maxi}$$

$$(V_{in\_inst})_{Max0} = 0,$$

$(V_{in\_inst})_{Maxi}$ being the value of a transition between the $i_{-th}$ and the $(i+1)_{-th\,parts}$ and $k_i$ and $b_i$ being constants whose values depend on the part i in question.

This peak current limitation setpoint is preferably proportional to the instantaneous voltage from the power supply source, with a progressive limitation of the gain beyond the normal range of amplitude variation of the voltage from the power supply source (Vin) ($k_i \leq k_{i+1}$).

FIG. 6 details a possible circuit for the primary peak current maximum setpoint generator 9 with a signal conditioning of the peak-clipped current. This is built around three resistors 30, 31, 32 connected in series, as a voltage divider, across the DC voltage terminals of the full-wave rectifier bridge 2 supplying the primary circuit Lp of the transformer 1 of the AC/DC converter.

The peak current maximum setpoint, calibrated in voltage, is the reflection of the instantaneous voltage appearing across the terminals of the rectifier bridge 2, reduced by the ratio corresponding to that of the value of the resistor 32 over the sum of the values of the resistors 30, 31, 32.

To these three resistors 30, 31, 32 is added a device imposing a limit to the range of variation of the upper peak current maximum setpoint value in order to take into account the over-voltages from the power supply network. The progressive limitation of the gain of the peak current maximum setpoint generator as a function of the input voltage allows the risks of instability associated with a peak-clipping to be reduced to a fixed maximum value. This progressive limitation is obtained by means of a diode 33 placed in series with a resistor 34 between the junction point of the resistors 30, 31 of the voltage divider and a regulated DC voltage terminal +Vcc, lower than the peak voltage across the DC terminals of the rectifier bridge 2, its anode being turned toward the regulated DC voltage terminal +Vcc in such a manner as to establish a shunt current toward the regulated DC voltage terminal +Vcc when the voltage at the junction point of the resistors 30, 31 tends to exceed that of the regulated voltage terminal +Vcc.

The diagram in FIG. 7 shows the waveform usually present, on start-up of an AC/DC converter having a peak current limitation with constant level according to the prior art, across the terminals of its power supply alternating electrical voltage source. That in FIG. 8 shows the waveform obtained under the same conditions with the peak current limitation proposed. A considerable reduction in the interference is noted.

The peak current limitation proposed allows a signal conditioning of the current absorbed by the converter at the moment of its start-up or after short interruptions of its power supply. The diagrams in FIG. 9 show the comparison of the absorbed current during the start-up phases; phase a, by a PFC corrector AC/DC converter with two stages and a corrector of the Boost type; and phase b, the same time variation for an AC/DC converter having the peak current limitation proposed.

The magnetization energy of the transformer 1 of the flyback converter is dissipated by a damping circuit 14, connected across the terminals of its primary winding L1. This reduces the parasitic oscillations produced by the circuit formed by the inductance of the transformer 1 and the stray capacitances on the primary side, during the period when the controlled switch 5 and the diode 3 placed on the secondary are not conducting, and allows the interference levels on the input current to be reduced to a negligible level.

FIG. 10 details a possible circuit for the damping device 14. This circuit is that of a dissipative damping circuit formed by a capacitor 70 connected in series with a resistor 71, in parallel across the primary $L_p$ of the isolation transformer 1.

As shown in FIG. 11, the magnetization energy of the isolation transformer 1 produces, across the terminals of the controlled switch 5, each time it opens, after the current in the diode 3 of the secondary circuit falls to zero, during a deadtime phase lasting until the next time the controlled switch 5 closes, a voltage oscillation due to the oscillating circuit formed by the primary inductance $L_p$ of the isolation transformer 1 and the stray capacitances of the primary circuit, mainly that of the output of the controlled switch 5. The presence of this voltage oscillation means that the controlled switch 5 is turned on, during a half-cycle of the supply network voltage, at both low and high voltages, which is the cause of switching losses in the controlled switch 5 resulting in a significant distortion of the input current.

The dissipative distortion reducer circuit with capacitor 70 and series resistor 71 allows, as shown in FIG. 12, this oscillation to be damped in a very efficient manner given that the dead time is at least longer than two oscillation periods.

FIG. 13 details another possible scheme for the transformer 1 magnetization energy damping device 14 of the AC/DC converter. This scheme is that where the transformer 1 is short-circuited during the dead-time phase appearing during the opening periods of the controlled switch 5 after the current in the diode 3 of the secondary circuit falls to zero. This short-circuiting is achieved by means of an auxiliary controlled switch 100 connected in series with a flywheel diode 101 in parallel with the primary $L_p$ of the transformer 1. The auxiliary controlled switch 100 is turned on outside of the time where the main controlled switch 5 is conducting in order to avoid any simultaneous conduction that could shortcircuit the rectifier bridge 2. The efficiency of the AC/DC converter is optimized by adjusting the non-overlap time between the opening of the auxiliary controlled switch 100 and the closing of the main controlled switch 5. In fact, when the auxiliary controlled switch 100 is opened, the oscillation re-appears. Thanks to this, the voltage across the terminals of the main controlled switch 5 goes through a minimum for which the switching losses are lower. This passage through a minimum voltage favorable to switching from the off state to the on state of the main controlled switch 5 corresponds to a quarter of an oscillation period. This leads to making the end of the non-overlap time coincide with a quarter of an oscillation period.

The device 14 for damping the magnetization energy of the transformer 1 of the AC/DC converter operating by shortcircuiting the transformer 1 has the advantage of not dissipating the magnetization energy but temporarily storing it by means of a current flowing in the primary winding $L_p$ of the isolation transformer 1. It allows, as shown in FIG. 14, a waveform without parasitic oscillations favoring the reduction of the power supply current distortions and an increase in the efficiency to be obtained across the terminals of the main controlled switch 5.

The AC/DC converter, which has just been described in relation to FIGS. 3 and the following figures, has three main modes of operation that depend on the situation encountered:

restart after an off time that is sufficiently extended for its output voltage to become too low to supply the elements of its secondary circuit, restart after an off time of short duration having left an output voltage subsisting that is high enough to supply the elements of its secondary circuit, and operation in steady-state mode.

When the converter restarts after being off for an extended period, the voltage on the secondary of the isolation transformer 2 is zero. All the elements of the converter placed within the secondary circuit are not therefore powered and no switching signal is delivered at the output of the galvanic isolation element 15'. On the other hand, the auxiliary oscillator 131 placed within the primary circuit of the transformer 1 operates as soon as the primary rectifier bridge 2 supplies power and delivers a switching signal corresponding to a maximum conduction setpoint for the controlled switch 5 (duty cycle 50%).

In this transient phase of operation, the closing of the controlled switch 5 is synchronous with the rising edge of the auxiliary oscillator 131. At each switching period, it is the primary peak current limitation protection that imposes the duty cycle of the controlled switch 5 depending on the constraints allowed for the components. The primary peak current limitation protection operates within the primary circuit in the reset control of the type-D flip-flop 135 of the pulse inhibitor circuit. The triggering of the primary peak current limitation protection resets this type-D flip-flop 135, which activates the pulse inhibitor circuit and causes the controlled switch 5 to turn off. The device is simple and robust.

In a first part of this transient phase, the AC/DC converter operates in continuous current conduction mode, with a low output voltage. The decrease of the current in the secondary diode 3 is slow and cannot reach zero at these terminals before the end of the switching period. When the secondary voltage is high enough, the galvanic isolation element 15' transmits to the primary circuit of the converter the switching signal coming to it from the main oscillator 10 via the modulator PWM 11. The synchronization is immediate and it is the switching signal coming from the modulator PWM 11 that is applied to the pulse inhibitor circuit in place of the signal from the auxiliary oscillator 131. The control of the controlled switch 5 becomes synchronous with the rising edge of the main oscillator 10 situated on the secondary.

In this phase of operation, which also corresponds to the cutouts of short duration and to the micro-cutouts, the duty cycle is maximum since the output voltage is not established and the error amplifier 12 for the secondary voltage is in saturation. The primary peak current limitation protection continues to fix the duty cycle, as in the absence of secondary voltage, the only difference being that the close command for the controlled switch 5 has become synchronous with the main oscillator 10 situated on the secondary.

When the secondary voltage is established, the error amplifier 12 is no longer in saturation and tends toward a value corresponding to an energetic equilibrium point so as to deliver the power required to the load at the setpoint output voltage. In this mode, the primary peak current limitation protection is no longer active. The command received by the controlled switch 5 corresponds to the switching signal coming from the modulator PWM 11 placed on the secondary. The pulse inhibitor device is no longer activated because its type-D flip-flop 135 no longer receives a reset command from the primary peak current limitation protection. It is transparent.

In summary, with the AC/DC converter that has just been described, the digital signal transmitted by the galvanic isolation element is the image of the command to the controlled switch providing the chopping of the primary current when primary peak current limitation protection is inactive.

When the absorbed current is higher than the peak current maximum setpoint, the AC/DC converter is controlled in current limiting mode, but the digital signal transmitted by the galvanic isolation element allows the AC/DC converter to always be synchronized. For this purpose, a minimum duty cycle is imposed on the modulator PWM.

An auxiliary oscillator placed on the primary side of its isolation transformer takes over when, as at start-up, the output voltage from the AC/DC converter is insufficient to power its elements placed on the secondary of its isolation transformer.

The advantages of such a device are manifold:

an excellent immunity from noise and other electromagnetic interference, the possibility of synchronizing the AC/DC converter simply using a central clock situated on the secondary, the opportunity for reducing the source frequency variations and additional electromagnetic interference, also production of a simple function: frequency variable as a function of the output voltage, the generation of synchronous signals or signals in phase opposition for the control of parallel AC/DC converters for example or for the generation of commands for complementary-MOS controlled switches of the 'idle' type.

The invention claimed is:

1. An AC/DC voltage converter with low anharmonic currents and using switch-mode regulation of a rectified current coming from a power supply source of alternating electric current, comprising:

a rectifier;

at least one controlled switch;

an error corrector configured to detect an output voltage error;

a peak current maximum set point generator configured to generate a limitation setpoint of peak current as a function of an instantaneous voltage from the power supply source; and a control device configured to control the at least one controlled switch using switching cycles with variable duty cycle adjusted in such a manner as to cancel the detected output voltage error and to maintain the limitation setpoint of peak current, said control device comprising an oscillator equipped with a pulse-width modulator PWM controlled by the error corrector in order to cancel an output voltage error, and a logic circuit inserted into the output of the pulse-width modulator PWM to ensure the disabling of the at least one controlled switch each time an instantaneous current flowing through the at least one controlled switch exceeds the limitation setpoint of peak current;

wherein the peak current maximum setpoint generator (9) generates a peak current limitation setpoint which is a spline function, by parts, of the instantaneous voltage from the power supply source meeting the definition:

$I_{pmax\_peak} = k_i V_{in\_inst} + b_i$ $i$ integer varying from 1 to $n$ n being the number of parts of the spline function defined by successive ranges of variations of the instantaneous voltage $V_{in\_inst}$ from the power supply source, an i-th part corresponding to the range:

$(V_{in\_inst})_{Max(i-1)} \leq V_{in\_inst} \leq (V_{in\_inst})_{Maxi}$ $(V_{in\_inst})_{Max0} = 0$, ($V_{in\_inst})_{Maxi}$ being the value of a transition between the $i_{-th}$ and $(i+1)_{-th\_parts}$ and $k_i$ and $b_i$ being constants whose values depend on the part i.

2. The converter as claimed in claim 1, further comprising:
an input circuit connected to the power supply source, the input circuit further comprising:
the controlled switch,
an output circuit galvanically isolated from the input circuit, and
a switch control device having elements divided between the input and output circuits,
wherein the switch control device comprises, in the output circuit, at least one error correction circuit integrating the difference between the output voltage of the converter and a setpoint voltage, and
wherein the switch control device comprises, at the interface between the input and output circuits, a galvanic isolation component transporting the output signal of the error correction circuit toward the input circuit, to the input of a control signal generator circuit for the controlled switch.

3. The converter as claimed in claim 1, with an input circuit connected to the power supply source containing the controlled switch, an output circuit galvanically isolated from the input circuit and a switch control device having elements divided between the input and output circuits, wherein the switch control device comprises, in the output circuit, at least one error correction circuit integrating the difference between the output voltage of the converter and a setpoint voltage, an oscillator with a variable duty cycle controlled by the error correction circuit supplying, for the controlled switch, a control logic signal with two states one of which corresponds to a conduction command, the other to an off command, being pulse-width modulated and, at the interface between the input and output circuits, a galvanic isolation component transporting toward the input circuit, to the controlled switch, the control logic signal.

4. The converter as claimed in claim 1, making use of an inductance, in switch-mode operation, supplied with current from the power supply source via the controlled switch, comprising an input current harmonic reduction circuit formed by an oscillation damping circuit connected across the terminals of the inductance.

5. An AC/DC voltage converter with low anharmonic currents and using switch-mode regulation of a rectified current coming from a power supply source of alternating electric current, comprising:
a rectifier;
at least one controlled switch;
an inductance for storing the current;
an error corrector detecting an output voltage error;
a peak current maximum set point generator configured to generate a limitation setpoint of peak current as a function of an instantaneous voltage from the power supply source;
a control device configured to control the at least one controlled switch by means of switching cycles with variable duty cycle adjusted in such a manner as to cancel the output voltage error and to maintain the limitation setpoint of peak current, said control device including:
an oscillator equipped with a pulse-width modulator (PWM) controlled by the error corrector in order to cancel an output voltage error, and
a logic circuit inserted into the output of the PWM to ensure the disabling of the at least one controlled switch each time an instantaneous current flowing through the at least one controlled switch exceeds the limitation setpoint of peak current;
an inductance, in switch-mode operation, supplied with current from the power supply source via the at least one controlled switch; and
an input current harmonic reduction circuit formed by an oscillation damping circuit connected across terminals of the inductance, wherein the input current harmonic reduction circuit is a dissipative circuit comprising a capacitor placed in a series with a resistor across the terminals of the inductance.

6. An AC/DC voltage converter with low anharmonic currents and using switch-mode regulation of a rectified current coming from a power source of alternating electric current, comprising:
a rectifier;
at least one controlled switch;
an inductance for storing the current;
an error corrector detecting an output voltage error;
a peak current maximum set point generator configured to generate a limitation setpoint of peak current as a function of an instantaneous voltage from the power supply source;
a control device configured to control the at least one controlled switch by means of switching cycles with variable duty cycle adjusted in such a manner as to cancel the output voltage error and to maintain the limitation setpoint of peak current, said control device including:
an oscillator equipped with a pulse-width modulator (PWM) controlled by the error corrector in order to cancel an output voltage error, and
a logic circuit inserted into the output of the PWM to ensure the disabling of the at least one controlled switch each time an instantaneous current flowing through the at least one controlled switch exceeds the limitation setpoint of peak current;
an inductance, in switch-mode operation, supplied with current from the power supply source via the at least one controlled switch; and
an input current harmonic reduction circuit formed by an oscillation damping circuit connected across terminals of the inductance, wherein the input current harmonic reduction circuit is a non-dissipative switched circuit comprising an auxiliary controlled switch placed in series with a flywheel diode across the terminals of the inductance, allowing the inductance to be short-circuited during the times where it is not supplied with current by the power supply source.

7. An AC/DC voltage converter with low anharmonic currents and configured to use switch-mode regulation of a rectified current coming from a power supply source of alternating electric current, comprising:
a rectifier;
at least one controlled switch;
an inductance for storing the current;
an error corrector detecting an output voltage error;
a peak current maximum set point generator configured to generate a limitation setpoint of peak current as a function of an instantaneous voltage from the power supply source;
a control device configured to control the at least one controlled switch by means of switching cycles with variable duty cycle adjusted in such a manner as to cancel the output voltage error and to maintain the limitation setpoint of peak current, said control device including:

an oscillator equipped with a pulse-width modulator (PWM) controlled by the error corrector in order to cancel an output voltage error, and a logic circuit inserted into the output of the PWM to ensure the disabling of the at least one controlled switch each time an instantaneous current flowing through the at least one controlled switch exceeds the limitation setpoint of peak current;

wherein the peak current maximum setpoint generator generates a peak current limitation setpoint which is a spline function, by parts, of the instantaneous voltage from the power supply source meeting the definition:

$$I_{pmax\_peak} = k_i V_{in\_inst} + b_i \text{ i integer varying from 1 to } n$$

n being the number of parts of the spline function defined by successive ranges of variations of the instantaneous voltage $V_{in\_inst}$ from the power supply source, an i-th part corresponding to the range:

$$(V_{in\_inst})_{Max(i-1)} \leq V_{in\_inst} \leq (V_{in\_inst})_{Maxi}$$

$$(V_{in\_inst})_{Max0} = 0,$$

$(V_{in\_inst})_{Maxi}$ being the value of a transition between the $i_{-th}$ and $(i+1)_{-th\ parts}$;

$b_i$ being constants whose values depend on the part i; and $k_i$ being constant gains whose values depend on part i with a progressive limitation of the gain ($k_i \leq k_{i+1}$) beyond the normal range of amplitude variation of the voltage from the power supply source.

8. The converter as claimed in claim 1, making use of an inductance, in switch-mode operation, of an isolation transformer providing a galvanic isolation between input and output, comprising:

on the secondary side of the transformer,
an error corrector delivering a setpoint which is a function of the difference presented by the output voltage of the converter with respect to a voltage setpoint;

straddling the boundary separating the primary and secondary sides of the transformer,
a coupler with galvanic isolation transmitting the output setpoint from the error corrector to the primary side of the transformer; and on the primary side of the transformer,
a rectifier circuit supplying an unregulated DC electrical voltage,
a pulse-width modulated oscillator controlled by the setpoint produced by the error corrector and transmitted by the coupler supplying, to the controlled switch, a switching signal composed of pulses,
a current sensor measuring the instantaneous current flowing through the controlled switch,
a peak current threshold crossing detector circuit comparing the setpoint delivered by the peak current setpoint generator with the instantaneous current measured by the current sensor, and
a pulse inhibitor circuit inserted between the pulse-width modulated oscillator and the control of the controlled switch, triggered by the threshold crossing detector circuit and reset by each pulse of the switching signal delivered by the pulse-width modulated oscillator.

9. The converter as claimed in claim 1, making use of an inductance, in switch-mode operation, of an isolation transformer providing a galvanic isolation between input and output, characterized in that it comprises:

on the secondary side of the transformer,
an error corrector delivering a setpoint which is a function of the difference presented by the output voltage of the converter with respect to a setpoint, and
an oscillator, called main oscillator, with pulse-width modulation controlled by the setpoint output from the error corrector, supplying a switching signal, straddling the boundary separating the primary and secondary sides of the transformer,
a galvanic isolation coupler transmitting the signal from the main oscillator toward the control of the controlled switch, on the primary side of the transformer,
a rectifier circuit supplying an unregulated DC electrical voltage,
an oscillator, called auxiliary oscillator, supplied by the rectifier circuit placed on the primary side of the transformer and supplying periodic pulses driving the controlled switch into conduction,
a routing circuit, with two inputs and one output, inserted behind the outputs of the auxiliary oscillator and of the coupler, giving priority to the signal, when it exists, from the main oscillator transmitted by the coupler,
a current sensor measuring the instantaneous current flowing through the controlled switch,
a peak current threshold crossing detector circuit comparing the setpoint delivered by the peak current setpoint generator with the instantaneous current measured by the current sensor, and
a pulse inhibitor circuit placed at the output of the routing circuit, triggered by the threshold crossing detector circuit and reset by each pulse crossing the routing circuit.

\* \* \* \* \*